Figure 1:
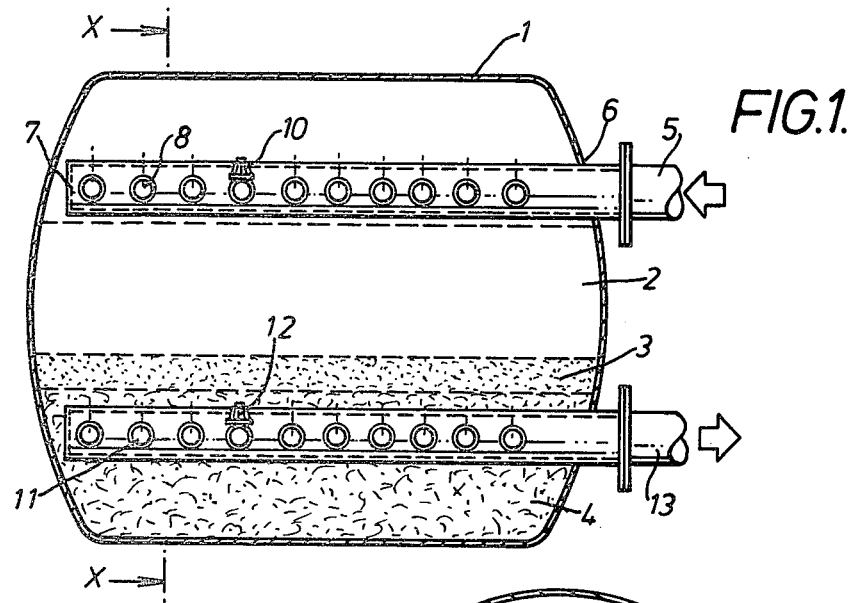

United States Patent [19]

Kerridge

[11] Patent Number: 4,472,281

[45] Date of Patent: Sep. 18, 1984

[54] METHOD OF REMOVING CONTAMINATING IMPURITIES FROM LEISURE POOL WATER

[76] Inventor: John R. Kerridge, Arnos Grove, London N.11, England

[21] Appl. No.: 473,708

[22] Filed: Mar. 9, 1983

Related U.S. Application Data

[63] Continuation of Ser. No. 339,178, Jan. 13, 1982, abandoned, which is a continuation of Ser. No. 166,187, Jul. 7, 1980, abandoned.

[30] Foreign Application Priority Data

Jul. 6, 1979 [GB] United Kingdom ................. 7923578

[51] Int. Cl.$^3$ .............................................. C02F 1/76
[52] U.S. Cl. ..................................... 210/668; 210/754; 210/763
[58] Field of Search ........ 210/668, 669, 694, 754–756, 210/758, 169, 199, 205, 287, 763; 252/421

[56] References Cited

U.S. PATENT DOCUMENTS

| | | | |
|---|---|---|---|
| 2,443,429 | 6/1948 | Marks et al. | 210/754 |
| 3,733,266 | 5/1973 | Bishop et al. | 210/668 |
| 4,131,566 | 12/1978 | Murty | 252/421 |

OTHER PUBLICATIONS

Derwent Abstract No. 53273B/29.

Primary Examiner—Ivars C. Cintins
Attorney, Agent, or Firm—Schwartz, Jeffery, Schwaab, Mack, Blumenthal & Koch

[57] ABSTRACT

A method of removing contaminating impurities, particularly haloamines, from leisure pool water is disclosed and an apparatus therefor. Pool water containing haloamine contaminants is passed into an active carbon bed of high surface area that has been treated with a reagent, for example hypohalous acid, that will convert a portion of it into a surface oxide so that the carbon either reacts with or catalyses the breakdown of the haloamines. The hypohalous acid is conveniently generated in the pool water prior to passage of it through the active carbon.

10 Claims, 3 Drawing Figures

U.S. Patent      Sep. 18, 1984      4,472,281

METHOD OF REMOVING CONTAMINATING IMPURITIES FROM LEISURE POOL WATER

This is a continuation of application Ser. No. 339,178 filed Jan. 13, 1982, which is a continuation of Ser. No. 166,187, filed July 7, 1980, both now abandoned.

This invention relates to a method of removing contaminating impurities from leisure pools. Within the term 'leisure pools' are included swimming pools, paddling pools, remedial pools, diving pools and the like.

Many methods have been tried over the years to adequately disinfect leisure pool, hereinafter known as 'pool' water and to remove noxious substances therefrom. It is of course important that destruction of pathogenic bacteria and their effective removal along with human excretory and metabolic products be as efficient as possible for the comfort and safety of people using the pool. One of the most frequently used methods of disinfection and purification has been treatment of the water with halogen, particularly chlorine in combination with a simple mechanical filtration plant, generally of sand. In such cases, the halogen has generally been used in amounts which provide about 0.038 mequiv/liter of hypohalous acid, which in the case of hypochlorous acid is about 2 mg/liter. Such a procedure is known conventionally as breakpoint chlorination.

Although chlorine has been extensively used for reasons of both economy and general efficiency, it has the drawback that it or products formed by it on reaction with water tend to react with nitrogen-containing waste products in the pool water, for example urea or ammonia, causing the formation of compounds which are highly irritating to the membranes of the eyes, nose and throat even in the very small quantities in which they are formed. The three compounds most usually formed and which give rise to most of the problems are monochloramine, dichloramine and nitrogen trichloride. Similar compounds are formed if bromine is used as the disinfecting agent instead of chlorine. The levels of these compounds vary considerably depending on the amount of soiling of the pool, but the ideal ratio of hypochlorous acid to ammonia in mg/liter is kept at around 2:1 by the breakpoint chlorination.

There has hitherto not existed an economical commercial method for either removing the noxious compounds formed or preventing their formation. I have now developed a method for either removing from pool water or preventing the formation in pool water of the undesirable haloamine compounds which cause such irritation.

Thus, according to one feature of the invention, I provide a method for removing monohaloamine or dihaloamine from, hindering the formation of nitrogen trihalide in, and generally disinfecting contaminated and halogenated pool water which comprises passing the pool water through an active carbon bed having a surface area in excess of 200 $m^2/g$, the active carbon being treated either prior to or during passage of the water therethrough with a reagent which forms a surface oxide on at least a portion of the active carbon that reacts with the monohaloamine thereby removing it from solution, the remaining portion of the active carbon acting as a catalyst in the breakdown of dihaloamine thereby hindering formation of nitrogen trihalide.

The active carbon will desirably have a surface area of greater than 500 $m^2/g$ and most preferably of about 1100 $m^2/g$. There is theoretically no upper limit for the surface area of the carbon which may be used but for economical reasons it is unlikely that active carbon having a surface area of 1500 $m^2/g$ or more will be used.

The amount of active carbon used will generally be dependent on its surface area and on the rate of flow of pool water through it. In general, for active carbon having a surface area of about 1100 $m^2/g$, a linear velocity through the active carbon bed of from 0.2 to 1.2 cubic meters/square meter cross-sectional area/minute is suitable, for example from 0.7 to 0.8 $m^3/m^2/min$. Clearly, the smaller the cross-sectional area or the smaller the surface area of the active carbon, the slower the flow rate should be in order to allow sufficient time for the desired reactions within the carbon bed to occur. Any rate faster than those above may cause compression and/or excessive breakdown of the active carbon granules. In general, for a flow rate of 6000 to 7000 gallons pool water per hour; about 3 $m^3$ of active carbon, or about 600 kg should be sufficient. The active carbon will desirably be changed about every two years.

The reagent used to convert the carbon into a surface oxide will most desirably be hypohalous acid at a suitable concentration. In the case of chlorination being the method of disinfection, the reagent will usually be hypochlorous acid. This may be generated either by direct or molecular chlorination, or else by addition of reagents providing hypochlorous acid for example alkali metal or alkaline earth metal hypochlorites, such as sodium hypochlorite or bleaching powder, $CaOCl_2$.

The reagent will be employed in a quantity effective to provide a sufficient quantity of the surface oxide. Where hypohalite is used as the surface oxide-generating reagent, it will generally be present in a quantity much higher than that tolerable by people in the pool itself. Whereas a normal hypohalous acid content in pool water is around 0.038 mequiv/liter, the hypohalous acid or hypohalite level in the pool water as it passes into the active carbon will desirably be from 0.057 up to 0.57 mequiv/liter, preferably from 0.11 to 0.19 mequiv/liter. In the case of hypochlorous acid, this means a level of from about 3 to about 30 mg/liter, preferably from 6-10 mg/liter. Such an increase in hypohalous acid level is most preferably brought about by injection of a suitable amount of halogen, halogen-generating or hypochlorous acid-generating reagent into the flow of pool water immediately prior to its passage into the active carbon. In this way, the maximum quantity of monohaloamine is formed in the pool water and then destroyed on the oxidised active carbon bed thus effectively eliminating as much ammonia in the form of haloamine from the pool water as possible. This occurs because the rate of formation of monohaloamine from ammonia is faster than that of other haloamine products within the pH range of pool water, which is preferably between pH 6 and pH 8.5. Removal of monohaloamine on an oxidised active carbon surface is faster than removal of other haloamines on an oxidised bed or otherwise.

The reagent capable of converting the carbon into a surface oxide may also be ozone, though use of this is less preferred because of the occupation of active sites in the carbon by the products of reaction, including molecular oxygen, which does not occur when halogenation is used.

After passage through the active carbon, the pool water will be almost halogen-free because of the dechlorinating properties of active carbon in addition to its other properties. It is thus generally desirable to re-halogenate the water e.g. with chlorine or bromine again, up to a safe and tolerable level prior to passing water back into the pool.

The method of the invention will desirably be employed in conjunction with a conventional sand filtration plant and will generally be situated downstream of it to prevent unwanted solid matter from entering the active carbon bed. The method of the invention may be operated as a system separate from existing purification methods and may simply be incorporated into existing systems.

The method has been found highly efficient in preventing the build-up of or removing the unpleasant halogen-containing nitrogen compounds found in pool water. Levels of removal of up to 80% have been achieved. The levels of halogenated amines and free residual hypohalous acids can be detected using standard optical kits based on absorption spectrametry. One such kit employs diethyl-p-phenylene diamine (DPD) which by itself will enable determination of the levels of hypohalous acid and which in the presence of a trace of potassium iodide will enable quite accurate detection of monochloramine. In the presence of excess potassium iodide, dichloramine can be detected. A similar method can be used to detect other haloamines. Measurements may be made on a Model TRL spectrometer (Wilkinson & Simpson, Newcastle, England).

In a preferred embodiment of the process, pool water leaves the pool in which it has become contaminated and is passed through a simple mechanical filter e.g. of sand or sand and gravel to remove any solid matter. It is then injected with chlorine or other hypochlorite generating agent in order to raise the halogen level to from 3 to 30 mg hypochlorous acid/liter, preferably from 6–10 mg/liter and the water is then passed into an active carbon bed having a surface area of about 1100 $m^2/g$ at a linear velocity of 0.2 to 1.2 cu.m/sq.m/min. The water front will desirably have a contact time of from 1 to 15 minutes in the active carbon bed. A contact time of from three to five minutes is desirable. On leaving the carbon bed, the halogen level is readjusted to normal tolerable levels and the water passed back into the pool.

It will be realised that all the changes outlined above will be effected at normal temperatures for pool water, e.g. from 12° to 40° C.

According to a further feature of the invention, I provide apparatus suitable for use in removing undesired impurities from contaminated and halogenated pool water which comprises a container (1) adapted in use to retain an active carbon bed (2), means for leading the pool water into (5) and out of (13) the container, said means being arranged within the container so as to allow passage of the pool water through the active carbon bed in a substantially laminar flow. There will preferably be means on the inlet pipe close to the point at which it enters the container which will allow the injection of an agent capable of forming a surface oxide on the active carbon in the presence of water. Such means may be integrally formed on the pipe or form a detachable section.

Figure 2:
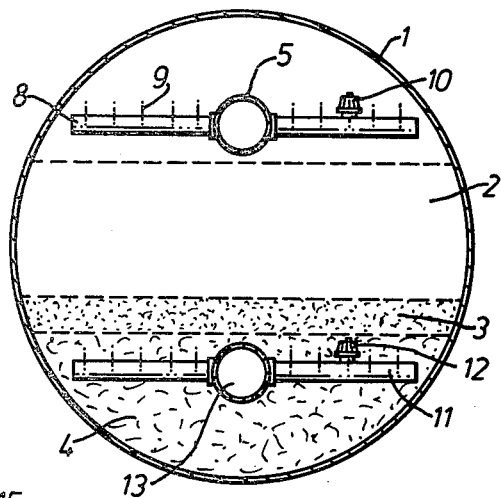

The invention will now be more particularly described with reference to the accompanying drawings, which are by way of Example only and in which FIG. 1 shows a cross-section of an apparatus according to the invention, FIG. 2 shows a cross-section of the apparatus of FIG. 1 along the line X—X in FIG. 1

Figure 3:
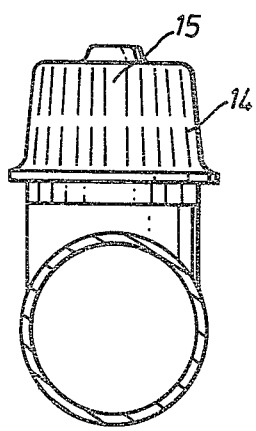

FIG. 3 shows an elevation of a nozzle of the type used in the apparatus shown in FIGS. 1 and 2

In FIGS. 1 and 2 a sealed container casing 1 is shown which is approximately 2000 mm long and 1500 mm in diameter. Retained in the container is an active carbon bed 2 supported on a layer of 16/30 silica sand 3 which in turn is supported by a base layer of pea gravel 4. An inlet pipe 5 of about 160 mm diameter is shown which passes through the casing at 6 and which extends inside the container for almost the full length of it until a closed end 7. Along the length of inlet pipe 5 within the container and symmetrically disposed on each side of it are a plurality of spreader arms 8, ten being shown, about 170 mm apart, on each of which are mounted a plurality of nozzles 9, only one being shown at 10, there being five nozzle stations shown about 90 mm apart. These nozzles allow the passage of pool water into the container with a minimum of turbulence so as to ensure as much as possible a smooth laminar flow down through the active carbon bed.

Spreader arms 11 and nozzles 12 are similarly disposed on outlet pipe 13 which lies within the layer of pea gravel 4. The pea gravel is sufficiently coarse to avoid penetrating the nozzles 12, and carries the layer of sand 3 to prevent the active carbon passing into the outlet pipe.

As close to the point at which the inlet pipe enters the container as possible, there will be situated an injector on the inlet pipe through which a halogen- or hypohalous-acid generating reagent may be introduced into the pool water. This enables rapid raising of the level of halogen or hypohalous acid so as to saturate so far as is possible the active carbon with surface oxide.

Although not shown, the container will generally be fitted with detachable covers, hatch openings and the like to enable access to the interior to be gained for maintenance or repair purposes and for filling. The container will also generally be mounted on a suitable support.

In FIG. 3 a nozzle is shown wherein passage of the water is via a plurality of narrow longtitudinal slots 14 in the hat 15 of the arrangement, this hat usually being detachable e.g. by unscrewing.

I claim:

1. A method for treating pool water to remove monohaloamine and dihaloamine, to hinder the formation of nitrogen trihalide and to generally disinfect said water comprising:
    treating an active carbon bed having a surface area in excess of 300 $m^2/g$ with 0.057 to 0.57 mequiv/liter of a hypohalous acid so as to form a surface oxide on at least a portion of the active carbon,
    passing pool water through the treated carbon bed having a surface oxide thereon,
    reacting said monohaloamine with said surface oxide to remove said monohaloamine from solution in the pool water,
    reacting said dihaloamine with said surface oxide in the presence of the remaining portion of said active carbon as a catalyst.

2. A method as claimed in claim 1 wherein the surface area of the active carbon is from 500 to 1500 $m^2/g$.

3. A method as claimed in claim 1 wherein the reagent capable of converting the carbon into a surface oxide is hypochlorous acid.

4. A method as claimed in claim 3 wherein the hypochlorous acid is present at a level of from 3 to 30 mg/liter.

5. A method as claimed in claim 4 wherein hypochlorous acid is formed by injecting chlorine into the pool water immediately prior to its passage into the active carbon.

6. A method as claimed in claim 1 wherein the pool water passes through the active carbon at a linear velocity of from 0.2 to 1.2 cu.m/sq.m cross-section/min.

7. A method as claimed in claim 1 wherein the pool water is rehalogenated after passage through the active carbon.

8. The method of claim 1, wherein said treating step occurs prior to passage of the pool water through said active carbon bed.

9. The method of claim 1, wherein said treating step occurs during passage of the pool water through said active carbon bed.

10. A method for treating pool water to remove monohaloamine and dihaloamine, to hinder the formation of nitrogen trihalide and to generally disinfect said water comprising:
- injecting chlorine into said pool water immediately prior to contacting said pool water with an active carbon bed in an amount sufficient to form hypochlorous acid at a concentration of 6–10 mg/l,
- passing said pool water containing hypohalous acid at a flow rate of from 0.7 to 0.8 $m^3/m^2$/min through an active carbon bed having a surface area of about 1100 $m^2/g$ for forming a surface oxide on at least a portion of the active carbon,
- reacting said monohaloamine with said surface oxide to remove said monohaloamine from solution in said pool water, and
- reacting said dihaloamine with said surface oxide in the presence of the remaining portion of said active carbon as a catalyst.

* * * * *